(12) United States Patent
Zhou

(10) Patent No.: US 9,529,140 B2
(45) Date of Patent: Dec. 27, 2016

(54) BACKLIGHT MODULE AND DISPLAY DEVICE

(71) Applicants: BOE TECHNOLOGY GROUP CO., LTD., Beijing (CN); BEIJING BOE CHATANI ELECTRONICS CO., LTD., Beijing (CN)

(72) Inventor: Peng Zhou, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/776,849

(22) PCT Filed: Apr. 20, 2015

(86) PCT No.: PCT/CN2015/076953
§ 371 (c)(1),
(2) Date: Sep. 15, 2015

(87) PCT Pub. No.: WO2016/045370
PCT Pub. Date: Mar. 31, 2016

(65) Prior Publication Data
US 2016/0299282 A1    Oct. 13, 2016

(30) Foreign Application Priority Data

Sep. 28, 2014  (CN) .................... 2014 2 0562720 U

(51) Int. Cl.
*F21V 8/00*    (2006.01)

(52) U.S. Cl.
CPC ........... *G02B 6/0055* (2013.01); *G02B 6/0031* (2013.01); *G02B 6/0073* (2013.01)

(58) Field of Classification Search
CPC .... G02B 6/0031; G02B 6/0055; G02B 6/0073
See application file for complete search history.

(56) References Cited

U.S. PATENT DOCUMENTS

| 9,086,512 | B2* | 7/2015 | Takase | ................. G02B 6/0031 |
| 2011/0149204 | A1* | 6/2011 | Son | ...................... G02B 6/0031 349/62 |
| 2011/0176327 | A1* | 7/2011 | Iwasaki | ................ G02B 6/0043 362/606 |
| 2014/0204609 | A1* | 7/2014 | Shin | .................... G02B 6/0031 362/609 |

* cited by examiner

*Primary Examiner* — Stephen F Husar
(74) *Attorney, Agent, or Firm* — Nath, Goldberg & Meyer; Joshua B. Goldberg

(57) ABSTRACT

The present invention discloses a backlight module and a display device. The backlight module includes a backplane, a reflector plate and an LED light bar, wherein the LED light bar includes a base and LED lights; the backplane includes a backplane main body part and a backplane side wall part; the reflector plate includes a reflector plate main body part and two reflector plate projections; the two reflector plate projections are respectively in contact with a first side face and a second side face of the base; the backplane side wall part is in contact with a third side face of the base; and the reflector plate main body part is in contact with a fourth side face of the base. The LED light bar can be fixed to the backplane without providing a fixing adhesive tape, and occurrence of a dark corner on the display device can be avoided.

18 Claims, 5 Drawing Sheets

BACKLIGHT MODULE AND DISPLAY DEVICE

This is a National Phase Application filed under 35 U.S.C. 371 as a national stage of PCT/CN2015/076953, filed Apr. 20, 2015, an application claiming benefit of Chinese Application No. 201420562720.2, filed Sep. 28, 2014, the content of each Of which is hereby incorporated by reference in its entirety.

FIELD OF THE INVENTION

The present invention relates to the field of display technology, and particularly relates to a backlight module and a display device.

BACKGROUND OF THE UTILITY MODEL

Backlight modules are classified into direct type backlight modules and edge type backlight modules according to different positions of light sources. In a direct type backlight module, light sources are directly arranged below a light emergent surface, and light generated by the light sources is emitted out as a surface light source after going through a spatial distance and being diffused and mixed by a diffusion plate; in an edge type backlight module, light sources are arranged on side faces of the backlight module, and light generated by the light sources is emitted into a light guide plate. The light guide plate can atomize linear light sources or point light sources into a uniform surface light source, then the light emitted from the light guide plate is diffused and deflected by a diffusion plate, and finally the divergence angle of the light is adjusted by a condenser lens.

FIG. 1 is a structural schematic diagram of an edge type backlight module in the prior art, FIG. 2 is a partially enlarged schematic diagram of structure Z in FIG. 1, FIG. 3 is a schematic cross-sectional view taken along A-A direction in FIG. 2, FIG. 4 is a structural schematic diagram of a reflector plate in FIG. 1, and FIG. 5 is a structural schematic diagram of a light guide plate in FIG. 1. As shown in FIGS. 1-5, the backlight module includes a backplane 1, a reflector plate 2, a light guide plate 3 and an LED light bar 4, wherein both of the reflector plate 2 and the light guide plate 3 are in the shape of rectangle, and the reflector plate 2 is located below the light guide plate 3; the LED light bar 4 includes a base 402 and an LED light 401 fixed on the upper surface of the base 402; a fixing adhesive tape 5 is formed on an area of the upper surface of the base 402 without LED light 401 covered thereon and on the upper surface of the backplane 1; and the fixing adhesive tape 5 is used for fixing the base 402 to the backplane 1.

However, when the base is fixed to the backplane through the fixing adhesive tape, the fixing adhesive tape will occupy a certain area, resulting in an increased width of a frame part of a display device. Meanwhile, since the LED light will produce heat in a light emitting process, the fixing effect of the fixing adhesive tape is instable. More importantly, when the backlight module needs to be reworked, residual adhesive is likely to be left on the backplane, which increases the difficulty of subsequent treatment. In addition, since the net point distribution area at two vertex angles β on the light guide plate is relatively small, enough brightness is unlikely to obtain through sufficient scattering, and meanwhile, the distances from the vertex angles to the closest LED light on the LED light bar are relatively large, so that the brightness at the two vertex angles β on the light guide plate will be obviously smaller than the brightness of other positions on the light guide plate, resulting in a dark corner on the display device in a display process to influence the display effect of the display device.

SUMMARY OF THE UTILITY MODEL

The present invention provides a backlight module and a display device, which, by means of a structure eliminating the use of a fixing adhesive tape structure, can avoid a variety of problems caused by fixing an LED light bar to a backplane through a fixing adhesive tape in the prior art. Meanwhile, the backlight module can also solve the problem that the brightness on a light emergent surface of a light guide plate in the prior art is non-uniform.

To achieve the above object, the present invention provides a backlight module, including: a backplane, a reflector plate and an LED light bar, wherein the LED light bar includes a base and LED lights fixed on an upper surface of the base;

the backplane includes a backplane main body part and a backplane side wall part formed by bending an edge area of the backplane main body towards inner side of the backplane;

the reflector plate includes a reflector plate main body part and two reflector plate projections located on a side face of the reflector plate main body part facing to the base;

the two reflector plate projections are in contact with a first side face and a second side face of the base, respectively, wherein the first side face and the second side face are two opposite side faces on the base; and the backplane side wall part is in contact with a third side face of the base, and the reflector plate main body part is in contact with a fourth side face of the base, wherein the third side face and the fourth side face are another two opposite side faces on the base.

Optionally, the backplane further includes a backplane upper edge part formed by bending an edge area of the backplane side wall part towards the inner side of the backplane, and the backplane upper edge part is in contact with upper surfaces of the LED lights.

Optionally, the backlight module further includes a light guide plate, which is located above the reflector plate and the base.

Optionally, the light guide plate includes a light guide plate main body part and light guide plate projections located on two side faces of the light guide plate main body part, and the light guide plate projections extend from the light guide plate main body part towards vertex angles of the LED light bar, respectively.

Optionally, shape of cross section of each light guide plate projection is a rectangle or a closed graph formed by line segments facing to the light guide plate main body part and curves back against the light guide plate main body part.

Optionally, density of net points in each light guide plate projection is larger than that of net points in the light guide plate main body part.

Optionally, the backlight module further includes a double sided adhesive tape, which is arranged between the light guide plate and the base.

Optionally, the backplane upper edge part is further in contact with an upper surface of the light guide plate.

Optionally, the backplane side wall part is perpendicular to the backplane main body part, and the backplane upper edge part is parallel to the backplane main body part.

To achieve the above object, the present invention further provides a display device, including a backlight module, wherein the backlight module is the above-mentioned backlight module.

The present invention provides a backlight module and a display device. The backlight module includes a backplane, a reflector plate and a LED light bar, wherein the LED light bar includes a base and LED lights, the backplane includes a backplane main body part and a backplane side wall part, the reflector plate includes a reflector plate main body part and reflector plate projections, the two reflector plate projections are respectively in contact with a first side face and a second side face of the base, the backplane side wall part is in contact with a third side face of the base, and the reflector plate main body part is in contact with a fourth side face of the base. In the technical solutions of the present application, the LED light bar can be fixed to the backplane without providing a fixing adhesive tape, so as to avoid a variety of problems caused by using the fixing adhesive tape in the prior art. In addition, in the technical solutions in the present application, by providing the light guide plate projections on the light guide plate main body, the net point distribution area in the surrounding of the corresponding vertex angles β is increased, and the brightness at the vertex angles β can be improved correspondingly, thus avoiding the occurrence of the dark corner on the display device.

DETAILED DESCRIPTION OF THE EMBODIMENTS

In order that those skilled in the art can better understand the technical solutions of the present invention, a backlight module and a display device provided by the present invention will be described in detail below in combination with the accompanying drawings.

First Embodiment

Figure 1:
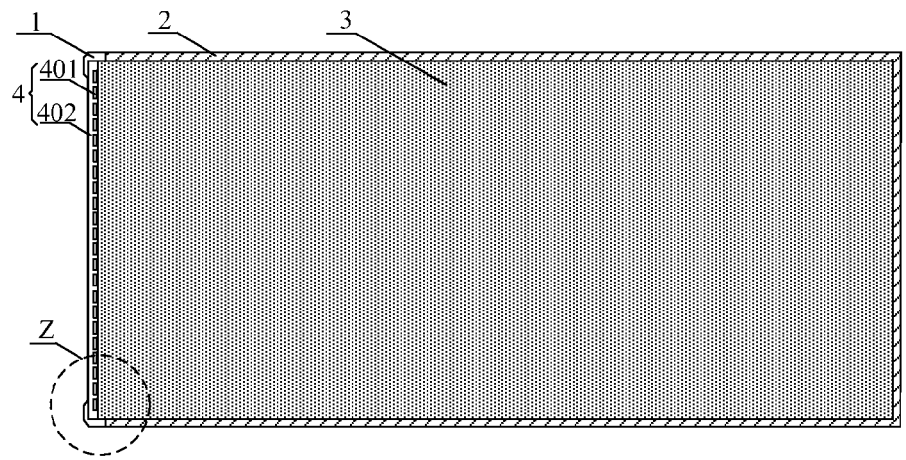
FIG. 1 is a structural schematic diagram of a edge type backlight module in the prior art.
Figure 2:
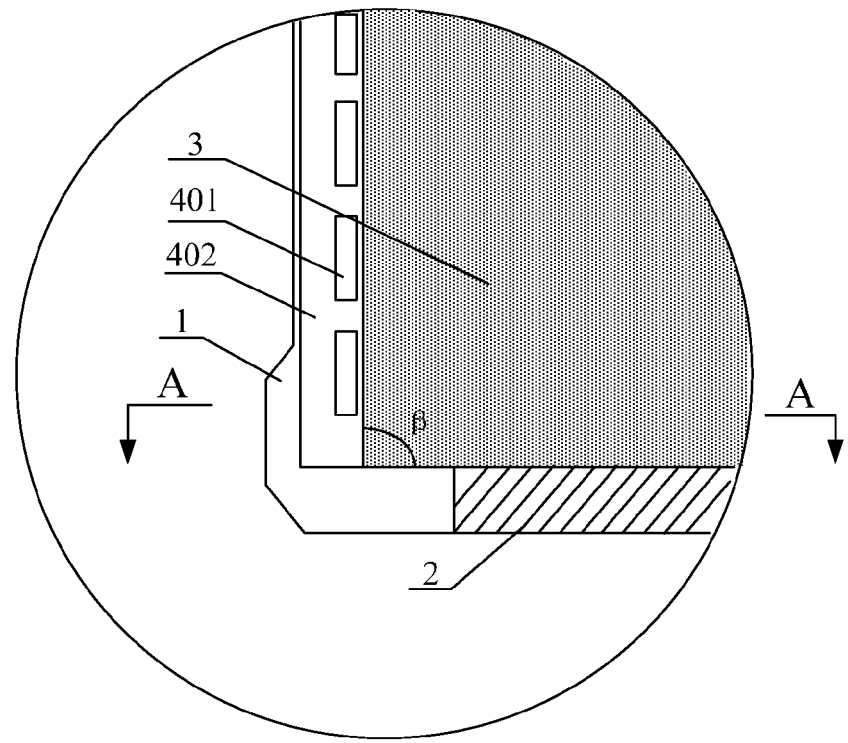
FIG. 2 is a partially enlarged schematic diagram of structure Z in FIG. 1.
Figure 3:
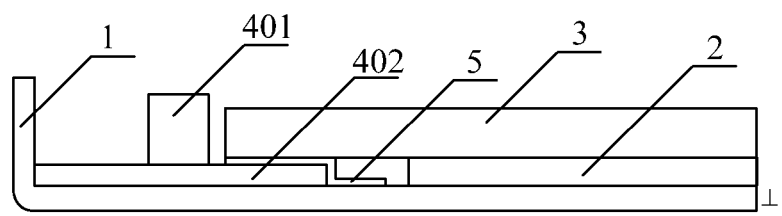
FIG. 3 is a schematic cross-sectional view taken along A-A direction in FIG. 2.
Figure 4:
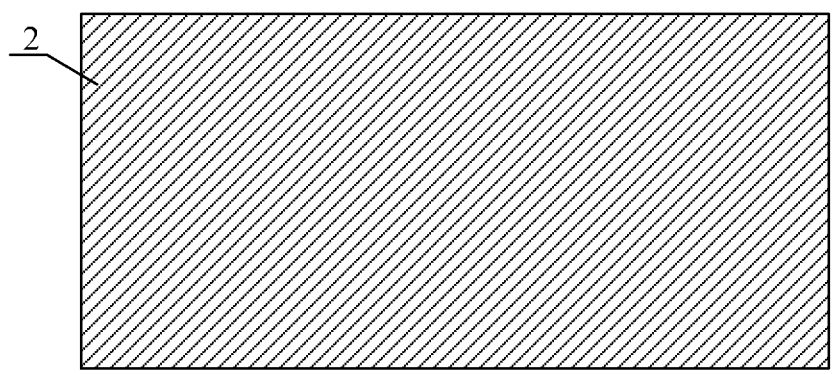
FIG. 4 is a structural schematic diagram of a reflector plate in FIG. 1.
Figure 5:
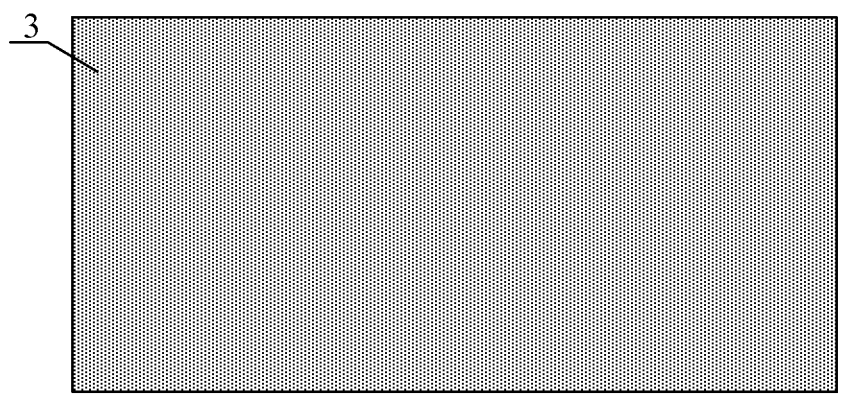
FIG. 5 is a structural schematic diagram of a light guide plate in FIG. 1.
Figure 6:
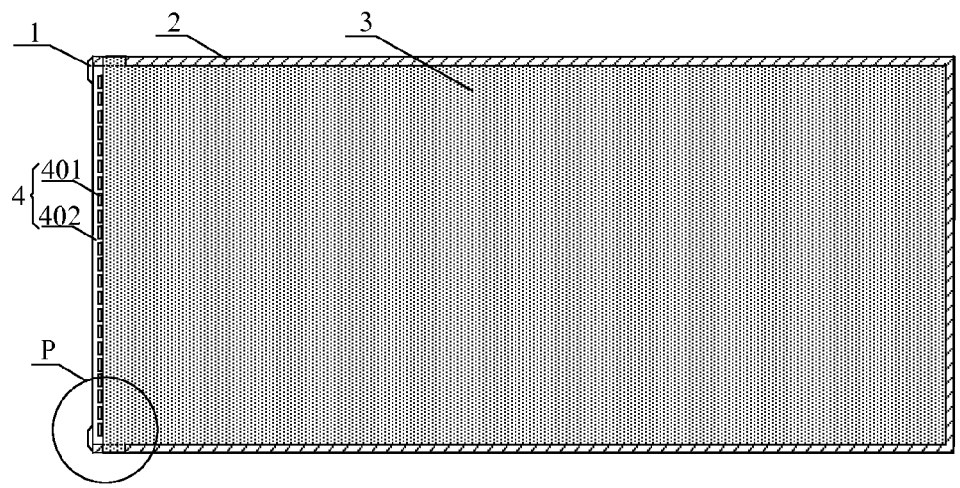
FIG. 6 is a structural schematic diagram of a backlight module provided by a first embodiment of the present invention.
Figure 7:
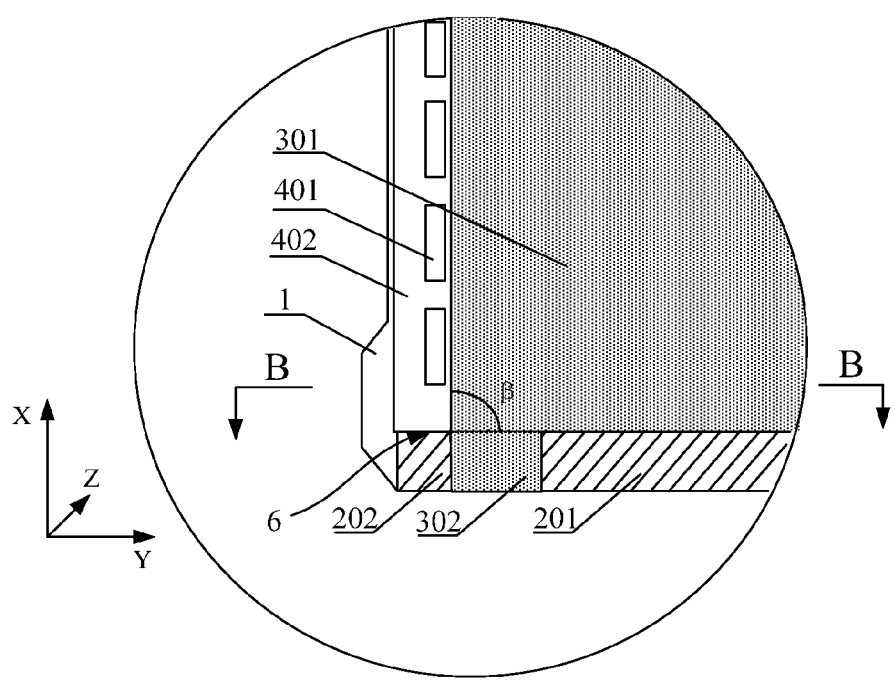
FIG. 7 is a partially enlarged schematic diagram of structure P in FIG. 6.
Figure 8:
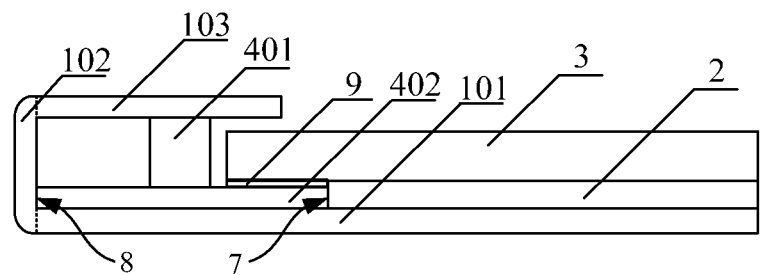
FIG. 8 is a schematic cross-sectional view taken along B-B direction in FIG. 7.
Figure 9:
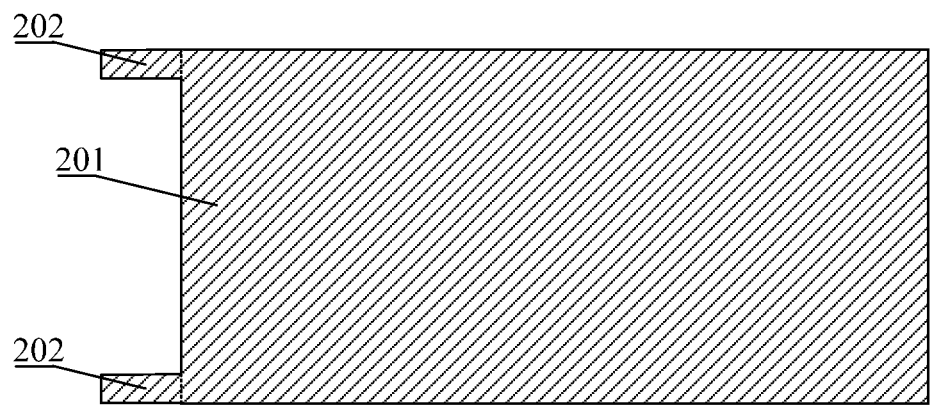
FIG. 9 is a structural schematic diagram of a reflector plate in FIG. 6.
Figure 10:
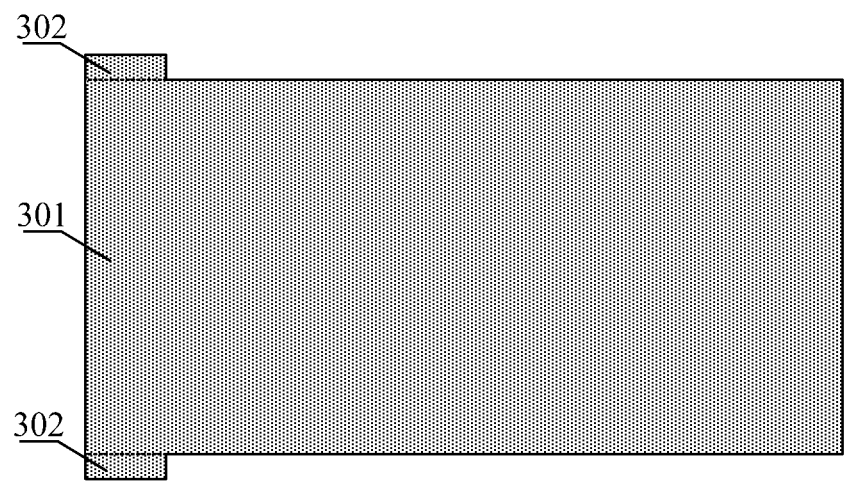
FIG. 10 is a structural schematic diagram of a light guide plate in FIG. 6.
Figure 11:
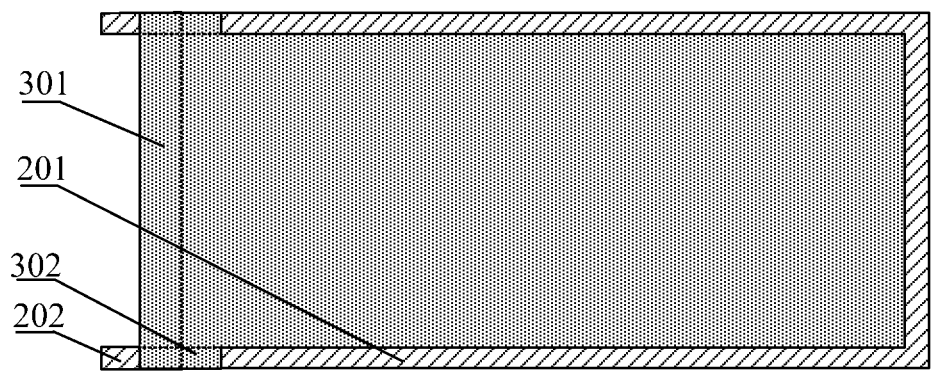
FIG. 11 is a schematic diagram of placing the light guide plate shown in FIG. 10 on the reflector plate shown in FIG. 9.

FIG. 6 is a structural schematic diagram of a backlight module provided by a first embodiment of the present invention, FIG. 7 is a partially enlarged schematic diagram of structure P in FIG. 6, FIG. 8 is a schematic cross-sectional view taken along B-B direction in FIG. 7, FIG. 9 is a structural schematic diagram of a reflector plate in FIG. 6, FIG. 10 is a structural schematic diagram of a light guide plate in FIG. 6, and FIG. 11 is a schematic diagram of placing the light guide plate shown in FIG. 10 on the reflector plate shown in FIG. 9. As shown in FIGS. 6 toll, the backlight module includes: a backplane 1, a reflector plate 2 and an LED light bar 4, wherein the LED light bar 4 includes a base 402 and a plurality of LED lights 401 fixed on the upper surface of the base 402; the backplane 1 includes a backplane main body part 101 and a backplane side wall part 102, and the backplane side wall part 102 is formed by bending the edge area of the backplane main body 101 towards the inner side of the backplane 1; the reflector plate 2 includes a reflector plate main body part 201 and two reflector plate projections 202 extending from the reflector plate main body part 201 towards the base.

In the backlight module provided by the embodiment, the two reflector plate projections are respectively in contact with a first side face 6 and a second side face (not shown) of the base to fix the LED light bar 4 in a first direction (a direction represented by the axis X in FIG. 7), wherein the first side face 6 and the second side face are two opposite side faces on the base 402; the backplane side wall part 102 is in contact with a third side face 8 of the base 402, the reflector plate main body part 201 is in contact with a fourth side face 7 of the base 402, and the backplane side wall part 102 and the reflector plate main body part 201 fix the LED light bar 4 in a second direction (a direction represented by the axis Y in FIG. 7), wherein the third side face 8 and the fourth side face 7 are another two opposite side faces on the base. In the embodiment, by assembling the backplane 1 and the reflector plate 2, the LED light bar 4 can be fixed to the backplane without providing a fixing adhesive tape. In the embodiment, since the fixing adhesive tape can be omitted, the width of the frame of the display device can be decreased, which facilitates implementing a narrow frame of the display device. In addition, in the process of reworking the backlight module provided by the embodiment, the problem of residual adhesive on the backplane will not occur.

Optionally, the backplane 1 further includes a backplane upper edge part 103, the backplane upper edge part 103 is formed by bending the edge area of the backplane side wall part 102 towards the inner side of the backplane 1, and the backplane upper edge part 103 is in contact with the upper surface of the LED light 401. In the embodiment, since the backplane upper edge part 103 is in contact with the upper surface of the LED light 401, and the backplane main body 101 is in contact with the lower surface of the base 402, the backplane main body 101 and the backplane upper edge part 103 fix the LED light bar 4 in a vertical direction (a direction represented by the axis Z in FIG. 7).

It should be noted that, in the embodiment, the first direction, the second direction and the vertical direction are perpendicular to each other.

In the technical solutions of the present application, by changing the structures of the reflector plate 2 and the backplane 1 in the prior art, the LED light bar 4 can be fixed to the backplane 1 just by the structural cooperation of the reflector plate 2 and the backplane 1, so as to avoid provision of the fixing adhesive tape. Meanwhile, since the fixing adhesive tape does not need to be arranged between the backplane 1 and the LED light bar 4, the rework process is simpler.

In the embodiment, optionally, the backplane side wall part 102 is perpendicular to the backplane main body part 101; further optionally, the backplane upper edge part 103 is parallel to the backplane main body part 101. The backplane 1 having the above-mentioned structure can cooperate with the reflector plate 2 to fix the LED light bar 4, and the backplane 1 is simple in structure and is convenient to prepare.

It should be noted that the above-mentioned structure in which the backplane side wall part 102 is perpendicular to the backplane main body part 101 and the backplane upper edge part 103 is parallel to the backplane main body part 101 is merely a preferred solution provided in the embodiment, and does not limit the technical solutions of the present application. After understanding the functions of the backplane main body part 101, the backplane side wall part 102 and the backplane upper edge part 103 in the present application, those skilled in the art can make corresponding variations based on the specific structures of the backplane main body part 101, the backplane side wall part 102 and the backplane upper edge part 103 in the embodiment, and these variations shall fall into the protection scope of the present application.

Referring to FIG. 10, in the embodiment, optionally, the backlight module further includes a light guide plate 3, and the light guide plate 3 is located above the reflector plate 2 and the base 4. Further optionally, the light guide plate 3 includes a light guide plate main body part 301 and light guide plate projections 302 located at two side faces of the light guide plate main body part 301; the two light guide plate projections 302 are respectively in contact with two vertex angles β, close to the LED light bar, on the light guide plate main body part 301, and in this case, the light guide plate projections 302 cover a part or all of the reflector plate projections 202 (FIGS. 7 and 11 merely show the case where the light guide plate projections 302 cover a part of the reflector plate projections 202, and no corresponding accompanying drawing is provided for the case where the light guide plate projections 302 cover all of the reflector plate projections 202). In the embodiment, due to the existence of the light guide plate projections 302, the net point distribution area in the surrounding of the corresponding vertex angles β is increased, and the brightness at the vertex angles β can be improved correspondingly. In addition, since the light guide plate projections 302 are located in a non-display area of a display panel, even if the light emission brightness at the light guide plate projections 302 is low, the display effect of the display panel will not be influenced.

In the embodiment, preferably, the shape of the cross section of each light guide plate projection 302 is a rectangle (see FIG. 10) or a closed graph (no corresponding accompanying drawing is provided) formed by line segments facing to the light guide plate main body part 301 and curves back against the light guide plate main body part 301. Configuring the shape of the cross section of each light guide plate projection 302 to be the rectangle or the closed graph formed by the line segments and the curves can facilitate processing and preparation of the light guide plate 3. Further optionally, when the light guide plate 3 is actually prepared, the light guide plate main body part 301 and the light guide plate projections 302 are integrally formed.

As another preferred solution of the embodiment, the density of net points in the light guide plate projection 302 is larger than that of net points in the light guide plate main body part, in this case, the brightness at the vertex angles β can be further enhanced, so that the brightness at the vertex angles β of the light guide plate 3 matches with the brightness of a central area, and thus the dark corner appearing in the display process of the display device can be effectively avoided.

In addition, optionally, a double sided adhesive tape 9 is further arranged between the light guide plate 3 and the base 402, and the double sided adhesive tape 9 can be used for fixing the light guide plate 3 and the base 402.

Optionally, the backplane upper edge part 103 is further in contact with the upper surface of the light guide plate 3, and the backplane upper edge part 103 works with the base 402 to fix the light guide plate 3 in the vertical direction.

The first embodiment of the present invention provides a backlight module, which includes a backplane, a reflector plate and a LED light bar, wherein the LED light bar includes a base and LED lights, the backplane includes a backplane main body part, a backplane side wall part and a backplane upper edge part, the reflector plate includes a reflector plate main body part and reflector plate projections, the two reflector plate projections are respectively in contact with a first side face and a second side face of the base to fix the LED light bar in the first direction, the backplane side wall part is in contact with a third side face of the base, the reflector plate main body part is in contact with a fourth side face of the base, the backplane side wall part and the reflector plate main body part fix the LED light bar in the second direction, the backplane main body part is in contact with the lower surface of the base, the backplane upper edge part is in contact with the upper surfaces of the LED lights, and the backplane main body part and the backplane upper edge part fix the LED light bar in the vertical direction. In the technical solutions of the present application, the LED light bar can be fixed to the backplane without providing a fixing adhesive tape, so as to avoid a variety of problems caused by using the fixing adhesive tape in the prior art. In addition, in the technical solutions of the present application, by providing the light guide plate projections on the light guide plate main body, the net point distribution area in the surrounding of the corresponding vertex angles β is increased, and the brightness at the vertex angles β can be improved correspondingly, thus avoiding the occurrence of the dark corner on the display device.

Second Embodiment

The second embodiment of the present invention provides a display device, which includes a backlight module, wherein the backlight module is the backlight module provided in the above-mentioned first embodiment. For specific contents, reference can be made to descriptions in the above-mentioned first embodiment, and they will not be repeated redundantly herein.

The display device in the embodiment can be any product or component having a display function, such as a liquid crystal panel, an electronic paper, an OLED panel, a liquid crystal television, a liquid crystal display, a digital photo frame, a mobile phone, a tablet computer, etc.

The second embodiment of the present invention provides a display device, and since the display device includes the backlight module in the above-mentioned first embodiment, the display device can achieve all beneficial effects of the backlight module.

It can be understood that the foregoing embodiments are merely exemplary embodiments used for illustrating the principle of the present invention, but the present invention is not limited hereto. Those of ordinary skill in the art can make various variations and improvements without departing from the spirit and essence of the present invention, and these variations and improvements shall fall within the protection scope of the present invention.

The invention claimed is:

1. A backlight module, comprising: a backplane, a reflector plate and an LED light bar, wherein
the LED light bar comprises a base and LED lights fixed on an upper surface of the base;
the backplane comprises a backplane main body part and a backplane side wall part formed by bending an edge area of the backplane main body towards inner side of the backplane;
wherein the reflector plate comprises a reflector plate main body part and two reflector plate projections extending from the reflector plate main body part towards the base;
the two reflector plate projections are in contact with a first side face and a second side face of the base, respectively, wherein the first side face and the second side face are two opposite side faces on the base; and
the backplane side wall part is in contact with a third side face of the base, and the reflector plate main body part is in contact with a fourth side face of the base, wherein the third side face and the fourth side face are another two opposite side faces on the base.

2. The backlight module of claim 1, wherein the backplane further comprises a backplane upper edge part formed by bending an edge area of the backplane side wall part towards the inner side of the backplane, and the backplane upper edge part is in contact with upper surfaces of the LED lights.

3. The backlight module of claim 2, further comprising: a light guide plate, which is located above the reflector plate and the base.

4. The backlight module of claim 3, wherein the light guide plate comprises a light guide plate main body part and light guide plate projections located on two side faces of the light guide plate main body part, and the light guide plate projections extend from the light guide plate main body part towards vertex angles of the LED light bar, respectively.

5. The backlight module of claim 4, wherein shape of cross section of each light guide plate projection is a rectangle or a closed graph formed by line segments facing to the light guide plate main body part and curves back against the light guide plate main body part.

6. The backlight module of claim 4, wherein density of net points in each light guide plate projection is larger than that of net points in the light guide plate main body part.

7. The backlight module of claim 3, further comprising: a double sided adhesive tape, which is arranged between the light guide plate and the base.

8. The backlight module of claim 3, wherein the backplane upper edge part is further in contact with an upper surface of the light guide plate.

9. The backlight module of claim 2, wherein the backplane side wall part is perpendicular to the backplane main body part, and the backplane upper edge part is parallel to the backplane main body part.

10. A display device, comprising the backlight module of claim 1.

11. A display device, comprising the backlight module of claim 2.

12. A display device, comprising the backlight module of claim 3.

13. A display device, comprising the backlight module of claim 4.

14. A display device, comprising the backlight module of claim 5.

15. A display device, comprising the backlight module of claim 6.

16. A display device, comprising the backlight module of claim 7.

17. A display device, comprising the backlight module of claim 8.

18. A display device, comprising the backlight module of claim 9.

* * * * *